Oct. 17, 1944. R. H. HILL 2,360,496
SWITCH
Filed Feb. 23, 1942 2 Sheets-Sheet 1
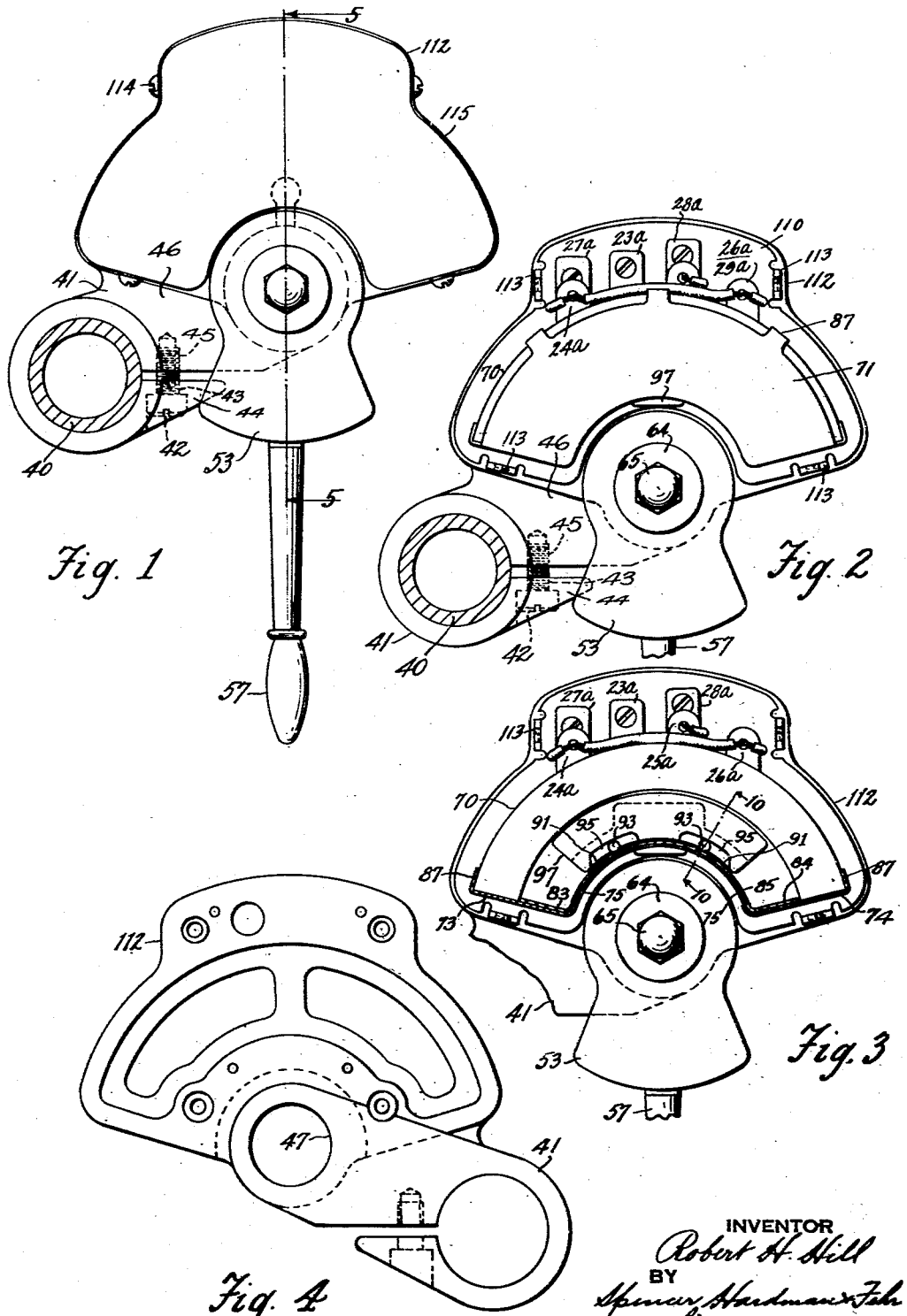

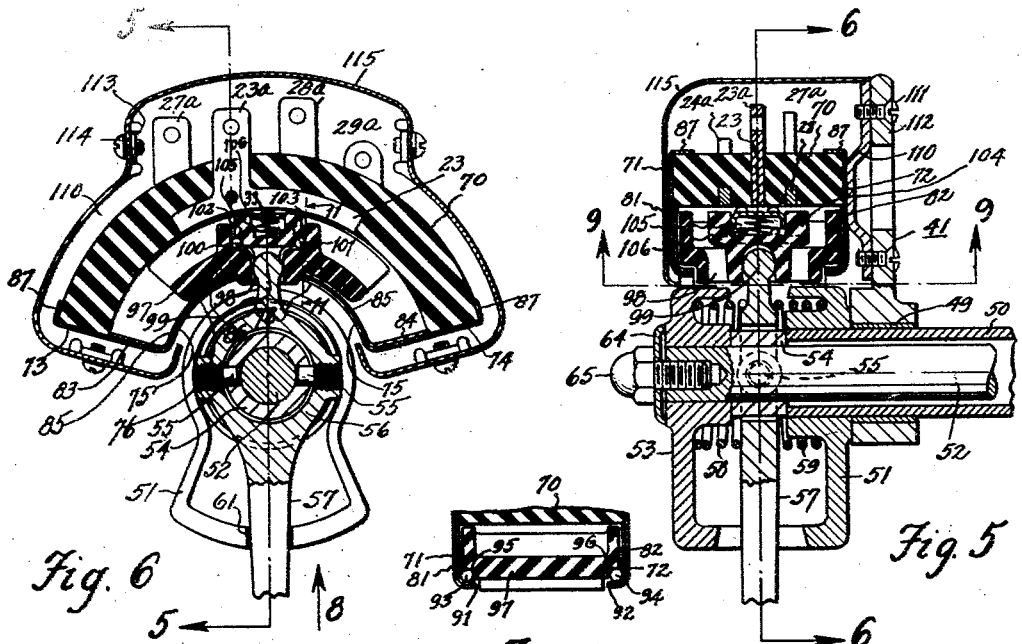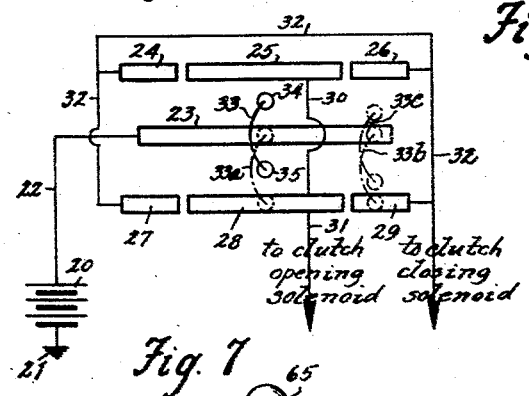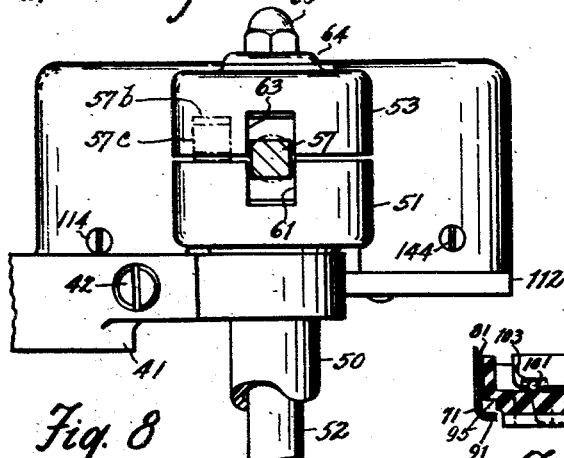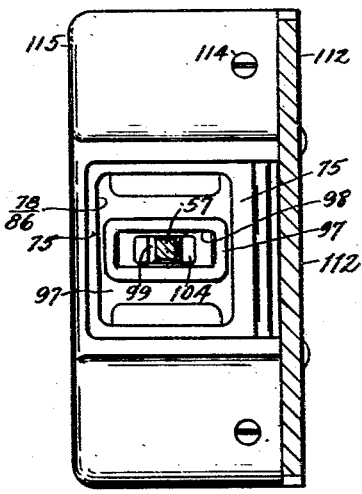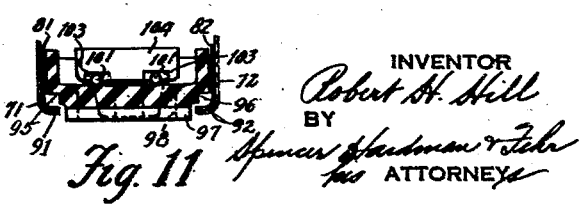

Patented Oct. 17, 1944

2,360,496

UNITED STATES PATENT OFFICE 2,360,496

SWITCH

Robert H. Hill, Anderson, Ind., assignor to General Motors Corporation, Detroit, Mich., a corporation of Delaware Application February 23, 1942, Serial No. 432,003

6 Claims. (Cl. 200—59)

This invention relates to electric switches of the type in which a movable contact moves in two paths at right angles to make or break electrical circuits. One use of such a switch is to control solenoids which control a servo-motor which operates the clutch between the engine and transmission gears of an automotive vehicle. The selection of the transmission gear trains is effected by movement of a gear-shift lever which is mounted for a short lateral movement in one path and a longer rotary movement in another path. The lever is first moved laterally in one direction or the other of its lateral movement and then is rotated in one direction or the other of its rotary movement to select one of four possible gear trains of the transmission. The switch movable contact moves in one of its paths when the gear-shift lever is moved laterally in order to establish a circuit which renders the clutch opening solenoid operative so that the engine will be disconnected from the transmission during the selecting of the gears by a rotary movement of the lever. By the time the lever has completed its rotary movement along the longer path, the switch movable contact will have been moved by the lever to disconnect the clutch opening solenoid and to connect the clutch closing solenoid with the current source. The operator then releases the lever and springs cause it to move laterally to a position mid-way between the extremes of its short lateral movement. During this last movement of the lever, the switch movable contact moves into position breaking connection between the current source and the clutch closing solenoid while servo motor continues to maintain the clutch in power transmitting status. In this way, current is not consumed except when selecting a gear train.

The object of the present invention is to provide a switch of simple design and compact construction which can be conveniently mounted near its operating lever which, in case of some automotive vehicles, is mounted adjacent the steering wheel. A further object of the invention is to provide the maximum freedom of movement of the movable switch contact in two paths. To this end, the switch provides a short track and a longer track at right angles for guiding the movements of the movable contact. The shorter track is carried by a movable body which supports the movable contact for movement in a shorter path; and the longer track is provided by the switch case which supports the movable body, and hence the movable contact for movement in a longer path at right angles to the shorter path. The movable contact rides on ball bearings engaging the shorter track provided by the movable body which rides on ball bearings engaging the longer track provided by the switch case.

Further objects and advantages of the present invention will be apparent from the following description, reference being had to the accompanying drawings wherein a preferred embodiment of the present invention is clearly shown.

In the drawings:

Fig. 1 is a plan view of a switch and mounting bracket embodying the present invention.

Fig. 2 is a view similar to Fig. 1, but with the mounting bracket and the switch terminal cover removed.

Fig. 3 is a view similar to Fig. 2 with a portion of the switch case shown in section.

Fig. 4 is an under-side view of the mounting bracket and switch base plate.

Fig. 5 is a sectional view on line 5—5 of Fig. 1 and Fig. 6.

Fig. 6 is a sectional view on line 6—6 of Fig. 5.

Fig. 7 is a wiring diagram illustrating the use of the switch.

Fig. 8 is a view taken in the direction of arrow 8 of Fig. 6.

Fig. 9 is a sectional view on line 9—9 of Fig. 5.

Fig. 10 is a sectional view taken on line 10—10 of Fig. 3.

Fig. 11 is a sectional view taken on line 11—11 of Fig. 6.

Referring to Fig. 7, a storage battery 20 grounded at 21 is connected by wire 22 with a stationary switch contact 23 located intermediate two rows of other stationary contacts. One row includes contacts 24, 25 and 26 and the other, contacts 27, 28 and 29. Contacts 25 and 28 are connected together by wire 30 and by wire 31 with a solenoid (not shown) for effecting the opening of the transmission clutch of an automotive vehicle. Contacts 27, 24, 26 and 29 are connected with wire 32 which is connected with a solenoid (not shown) for effecting the closing of a vehicle transmission clutch. A movable bridging contact 33 having contact bosses 34 and 35 cooperate with the stationary contacts to control the energization and deenergization of the clutch controlling solenoids. Contact 33 is caused to move into and out of engagement with the stationary contact in response to movement of a gear shift controlling lever, to be described.

Fig. 7 illustrates the movements of contact 33 when the gear shift lever is moved into one of its four gear-selecting positions. As will be explained later, the first movement of the gear-shifting lever is a movement which will cause the contact 33 to be moved from a neutral position into position 33a in which it bridges contacts 23 and 28, thereby causing the clutch opening solenoid to be energized so that the clutch is caused to open. The lever is then moved in a direction at right angles to its first movement in order to select a certain gear train of the transmission, and during this movement the movable contact 33 moves from the position 33a to position 33b wherein it bridges contacts 23 and 29 and has disengaged from contact 28. The clutch opening solenoid has been deenergized and the clutch closing solenoid has been energized so that, after the gear train has been selected and connected in the transmission line, the engine clutch will be closed. When the driver releases the gear selecting lever, a spring, to be described, causes the movable contact 33 to move to the position 33c thereby disconnecting contacts 23 and 29. Under these conditions the clutch closing solenoid is disconnected from the battery, but the clutch remains closed. The clutch opening solenoid is connected with the battery by the bridging of contacts 23 and 28 or 23 and 25. The operation of selecting either one of the other three trains of gears is accompanied by movements of the switch contact 33 similar to those illustrated in Fig. 7. Contact 33 can be moved first into the position 33a as shown and then toward the left so as to bridge contacts 23 and 27. Contact 33 can also be moved so as first to bridge contacts 23 and 25 and then 23 and 26, or first to bridge contacts 23 and 25 and then contacts 23 and 24.

Applicant makes no claim to the electrical system illustrated in Fig. 7. The present invention resides in a novel switch coordinated with a gear selecting lever for establishing the circuits shown in Fig. 7. This switch will now be described.

A stationary tube 40, Fig. 1, which may be the stationary steering wheel post of an automotive vehicle, provides a support for a clamp bracket 41 tightened by a screw 42 which passes through a plain hole 43 in arm 44 of the contact and into a threaded hole 45 in the main portion 46 of the bracket. Bracket 41 provides an opening 47 (Fig. 4) parallelling the opening which receives the tube 40. In the opening 47 there is press-fitted a bearing bushing 49 (Fig. 5) for supporting a rotatable tube 50 having one end connected with a sector 51 and the other end, not shown, connected with a mechanism for selecting either of two sets of gear trains with the transmission, depending on which way the tube is rotated. Tube 50 encloses a rod 52 one end of which is attached to a sector 53 and the other end, not shown is attached to a mechanism for selecting either one of two other gear trains of the transmission, depending upon which direction the rod 52 is rotated. Between the sector 53 and the tube 50 there is located a sleeve 54 which is loosely journalled on the rod 52. Sleeve 54 is provided with diametrically opposite holes for receiving the smooth ends of trunnion screws 55 attached as shown in Fig. 6 to the ring-like portion 56 of a gear selecting lever 57. The lever 57 is maintained normally in its neutral position by springs 58 and 59 confined under compression between the lever 57 and the sectors 51 and 53. Sector 53 is retained by a washer 64 and a screw 65 attached to rod 52.

Sector 51 has a notch 61 in alignment with a notch 63 of sector 53. In its neutral position, lever 57 is received by both notches 61 and 63. Lever 57 cannot be rotated about the axis of collar 54 without first moving lever 57 laterally so that it occupies only the notch 61 or only the notch 63. Attempting to rotate the lever 57 while occupying the position shown in Fig. 8 would be an attempt to rotate both sectors 51 and 53 at the same time thereby resulting in an attempt to select two trains of gears at the same time, which would be an impossibility. Therefore lever 57 must first be moved from the position shown in Fig. 8 either wholly into the notch 61 before the sector 51 can be rotated in either direction, or lever 57 must be moved in order to occupy only the notch 63 before lever 57 can rotate sector 53 in either direction. As with gear-train-selecting levers generally in use on automotive vehicles, the lever 57 must first be moved a short distance laterally before it can be rotated the longer distance in either direction. The lateral movement of lever 57 as shown in Fig. 5 is a short rotary movement about the axis of the trunnion screws 55 and this is followed by longer rotary movement in direction at right angles to the direction of the shorter movement to effect rotation either of the tube 50 or the rod 52 depending on which way the lever 57 has first been rotated laterally about the axis of its trunnion screws 55. These two movements of the gear train selector lever 57 are used to control a switch which is the subject of the present invention.

The stationary contacts of the switch (contacts 24 through 29) are embedded in an arcuate non-conducting body 70 which provides the cylindrical top wall of a switch case having arcuate side walls 71 and 72, flat end walls 73 and 74 and a cylindrical bottom wall 75 having an aperture at 76. These switch parts enclose a switch case liner having arcuate side walls 81 and 82, flat end walls 83 and 84 and arcuate bottom wall 85 apertured at 86 in alignment with aperture 76. The tongues 87 of the switch case end wall members 71, 72, 73 and 74 are bent down over the outer surface of the block 70 to force the block 70 against the upper edges of the liner walls 81, 82, 83 and 84 thereby causing the liner bottom wall 85 to be forced against the case bottom wall 75. In this way the liner side and bottom walls provide arcuate tracks or races 91 and 92 for receiving pairs of balls 93 and 94 which are received in races provided by arcuate pockets 95 and 96 formed in the sides of a non-conducting block 97 having an elongated aperture 98 parallelling the axes of tube 50 and rod 52. The aperture 98 receives the ball-shaped upper end 99 of the gear selecting lever 57. When lever 57 is rotated laterally about the axis of the trunnion screws 55, the ball end 99 moves lengthwise of the aperture 98 without producing any movement of block 97. When lever 57 is rotated about the axes of the tube 50 or rod 52, then the block 97 is caused to rotate about the axis of rod 52, said block being anti-frictionally supported by the balls 93 and 94.

The block 97 is shaped as shown in Fig. 6 to provide tracks or races, parallelling the axes of rod 52 and tube 50 for receiving pairs of balls 100 and 101 received in pairs of pockets 102 and 103 provided in opposite sides of a contact carrier 104 having a recess 105 for receiving the movable contact 33 which is urged upwardly by spring 106 so that said contact 33 will press firmly against the block 70 or the contacts supported thereby. Spring 106 urges contact carrier 104 downwardly to cause its ball bearings 100 and 101 to be firmly engaged by the bearing races provided by the parts 104 and 97; and likewise the block 97 is urged downwardly so that all play is taken up between the balls 93 and 94 and the races thereof provided by block 97 and the bearing races 91 and 92 provided by the switch case liner walls 81 and 82.

The metallic wall 72 of the switch case is secured to a switch base 110 by welding or other suitable manner. Base 110 is attached by screws 111 to a pad 112 forming a part of the bracket 41. Switch base 110 is provided with ears 113 having threaded openings for receiving screws 114 by which a cover 115 may be secured for enclosing the switch and the various stationary contact terminals, such as 23a, extending from their respective stationary contacts.

The arrangement of contacts shown in Fig. 7 is that which will be seen by looking in the direction of the arrow 8 toward the under-side of the block 70. Let it be assumed for purposes of illustration that one of the gear trains is selected by pulling the lever 57 upwardly or toward the observer in Fig. 1 and then moving it clockwise. This results in moving the lever 57, Fig. 8, into the notch 63 and moving the sector 53 clockwise in Fig. 1. While lever 57 is moving into notch 63, lever 57 is being rotated clockwise about the axis of its pivot screws 55 thereby causing the spherical lever end 99 to move toward the right in Fig. 5 thereby causing movement of the contact carrier 104 toward the right in order to move switch contact 33 into engagement with contacts 23 and 28 (Fig. 7). Thus far no movement of block 97 has taken place. When lever 57 is rotated clockwise about the axis of rod 52, then the carrier 104 together with the block 97 are rotated clockwise due to the direct engagement of the spherical end 99 with the block 97. This causes the contact 33 to move from the position 33a to that shown in 33b while the driver is still pulling up on the lever 57 which then is in the position represented by the rectangle 57b (Fig. 8). When the driver releases the lever 57, then in the position 57b, said lever is urged by spring 58 to the position 57c wherein it bears downwardly against the sector 51. During movement of the lever 57 from the position indicated at 57b to that indicated at 57c, the contact 33 moves from the position 33b to position 33c thereby disconnecting contact 29 from contact 23 and interrupting the connection of the battery 20 with the clutch closing solenoid in order to save current, the clutch remaining closed until caused to open by energization of the clutch opening solenoid.

From this description of a particular movement of the lever 57 for selecting one of the four gear trains it will be apparent that, as to the selection of any one of these other gear trains, there is first a bridging of contact 23 either with contact 28 or with contact 25 in order to effect energization of the clutch opening solenoid and this is followed by the bridging of contact 23 with one of the contacts 24, 26 and 27 in order that the clutch opening solenoid will be disconnected and the clutch closing solenoid will be connected with the battery. It will also be understood that when the driver releases lever 57 after having moved it into one of these other gear selecting positions that the contact 33 will be moved either by the spring 58 or by the spring 59 into contact opening position.

From the foregoing description of the construction and method of operation of the switch, it is apparent that I provide a switch having a single movable contact which is moved along two paths at right angles to one another by a single operating member which is the transmission gear train selector lever. Furthermore, I have provided anti-friction supports for the movable contact along these two paths of movement. I have provided a switch of compact construction, which can be mounted in a small switch case supported by a bracket fixed to a steering column or other fixed part convenient to the driver.

While the embodiment of the present invention as herein disclosed, constitutes a preferred form, it is to be understood that other forms might be adopted, all coming within the scope of the claims which follow.

What is claimed is as follows:

1. An electrical switch comprising stationary contacts arranged in a plurality of rows, a movable contact for bridging certain stationary contacts and means for supporting the movable contact for movement across the rows and for movement along the rows, said means comprising a fixed track parallelling the rows, a contact-carrier-supporting block guided by the fixed track for movement along the rows, said block having a track at right angles to the fixed track and a contact carrier supporting the movable contact and guided by the track of the block for movement across the rows, and means for moving the contact carrier along its track and for moving the contact-carrier-supporting block along its track.

2. An electric switch comprising stationary contacts arranged in a plurality of rows and embedded in a non-conducting block, a movable contact for bridging certain stationary contacts, a switch case enclosing the contacts and including the block as one wall and having other walls shaped to provide spaced bearing races at inside corners of the case remote from the block, ball bearings contacting said bearing races of the case walls, a contact-carrier-supporting block having pockets receiving said ball bearing and providing races therefor, said contact carrier-supporting block having bearing races extending at right angles to the races of the case walls, ball bearings supported by the last mentioned races, a contact carrier supporting the movable contact and having pockets receiving the last mentioned ball bearings and providing races therefor, a spring interposed between the contact carrier and the movable contact supported thereby for urging the movable contact toward the stationary contacts and for urging the contact carrier toward the races provided by the contact-carrier-supporting block and for urging the contact-carrier-supporting block toward the races provided by the switch case walls whereby the bearing races engage the bearings, and means for moving the contact-carrier and the contact carrier supporting block.

3. An electrical switch comprising stationary contacts arranged in a plurality of rows, a movable contact for bridging certain stationary contacts and means for supporting the movable contact for movement across the rows and for movement along the rows, said means comprising a fixed track parallelling the rows, a contact-carrier-supporting block guided by the fixed track for movement along the rows, said block having a track at right angles to the fixed track and a contact carrier supporting the movable contact and guided by the track of the block for movement across the rows, and a member movable in either direction along two paths parallelling the two tracks, said member having a part extending through a hole in the contact-carrier-supporting block, said hole being elongated in the direction of the track provided by said contact-carrier-supporting block, and said part engaging a notch between two lugs of the movable contact carrier, said lug being received by the elongated hole in the contact carrier supporting block.

4. An electric switch comprising; a main stationary contact; auxiliary stationary contacts arranged in a plurality of rows disposed on opposite sides of the main stationary contact; a movable contact for bridging the main stationary contact with any one of the auxiliary contacts; a carrier for the movable contact; a movable support for the carrier capable of moving along the rows; an actuator for the carrier, said actuator being pivotally supported on the vertical and on the horizontal; and guide means provided by the movable support for determining the sequence of pivotal movement for the actuator, said guide means first guiding selectively the actuator in either direction on one of its pivots to move the carrier across the rows causing the movable contact to bridge the main contact with one of the auxiliary contacts before the actuator is capable of moving selectively in either direction on its other pivot to move the carrier and the support along the rows causing the movable contact to bridge the stationary contact with another auxiliary contact.

5. An electrical switch comprising stationary contacts arranged in a plurality of rows; a movable contact for selectively bridging certain stationary contacts; means for supporting the movable contact for movement across the rows and for movement along the rows; means for moving the movable contact in either direction along either path of movement; and means associated with the supporting means for causing the movable contact to be moved in one direction or the other across the rows on the supporting means before said supporting means and movable contact can be moved along the rows.

6. An electric switch comprising a casing carrying stationary contacts arranged in a plurality of rows; a movable block within the confines of the casing and guided by the casing along the rows; a switch mechanism having a bridge supported by the block and adapted to cooperate with the stationary contacts; provisions provided by the block and the switch mechanism for guiding the switch mechanism across the rows; and an actuator supported relative to the housing, said actuator having a connection with the provisions of the switch mechanism whereby both the switch mechanism and the block move simultaneously along the rows, said provisions being so arranged that switch mechanism must move across the rows before the block and switch mechanism can move along the rows.

ROBERT H. HILL.